Nov. 19, 1963  C. T. BOONE, SR  3,111,300
BUTTERFLY VALVE STRUCTURE
Filed May 12, 1960

INVENTOR
Claude T. Boone, Sr.

BY

ATTORNEY 3,111,300
BUTTERFLY VALVE STRUCTURE
Claude T. Boone, Sr., 4104 Ave. H, Lubbock, Tex.
Filed May 12, 1960, Ser. No. 28,571
2 Claims. (Cl. 251—306)

This invention relates to valves for water conduits, and it has particular reference to a valve adapted for use in water distribution pipes generally employed for the irrigation of fields prepared for planting, and for growing crops, which often requires that the conduits be moved from one location to another to conduct water from wells or other suitable sources to irrigation channels. Water conduits for such use are commonly formed of relatively thin gauge aluminum, and in sections of predetermined lengths, to expedite transportation and handling.

The present invention applies particularly to a valve for installation at spaced intervals along each section or joint of said conduits, one of which may be provided for each of a plurality of rows which are to be served by a water supply pipe common to all of such rows, to control the supply of water to the respective rows.

A prime object of the invention resides in the provision of a butterfly type of valve of simple design and economical construction which can be easily assembled, installed, and repaired as necessary in the field by unskilled workmen, without special tools, or without parting the flow line, yet affording an efficient, rugged closure for each outlet.

Another object of the invention is that of providing a valve which is capable of being operated freely, and without breaking off the handle or incurring other damage thereto, in the presence of sand and other substances which often accumulate adjacent such valves in such manner as to make them difficult to open and close, sometimes damaging the valves.

Broadly, the invention contemplates the provision of an effective but simple valve structure for light and portable aluminum irrigation pipes which is economical in design and readily installed or replaced with a minimum of effort and expense.

While the foregoing objects are paramount, other and lesser objects will become manifest as the description proceeds, taken in connection with the appended drawings wherein.

Figure 1:
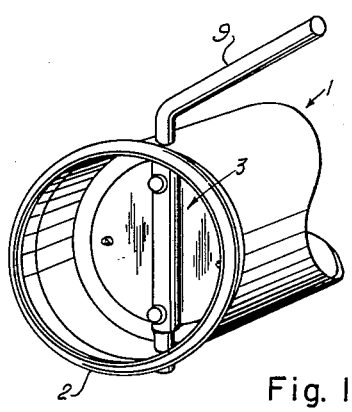
FIGURE 1 is a fragmentary perspective view of a length of pipe having a valve embodying the invention incorporated therein.
Figure 2:
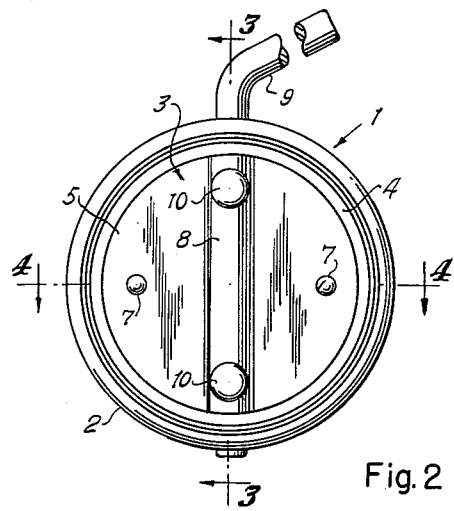
FIGURE 2 is an end view thereof, showing the valve in closed position.
Figure 3:
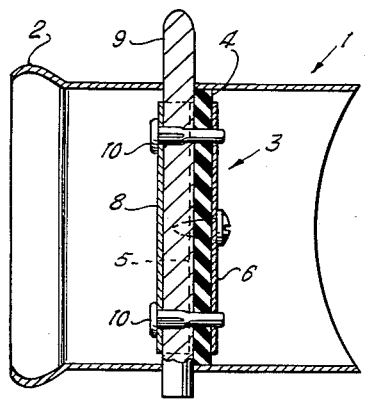
FIGURE 3 is a longitudinal sectional view, taken on the line 3—3 of FIGURE 2, showing the valve element closed.
Figure 4:
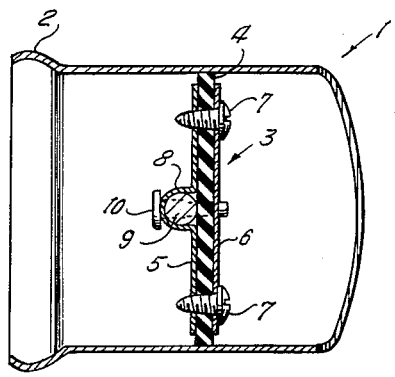
FIGURE 4 is a longitudinal sectional view taken on the line 4—4 of FIGURE 2.
Figure 5:
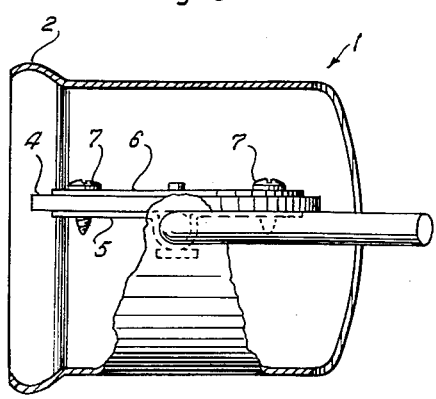
FIGURE 5 is a longitudinal view, partly broken away, showing the valve element in open position.
Figure 6:
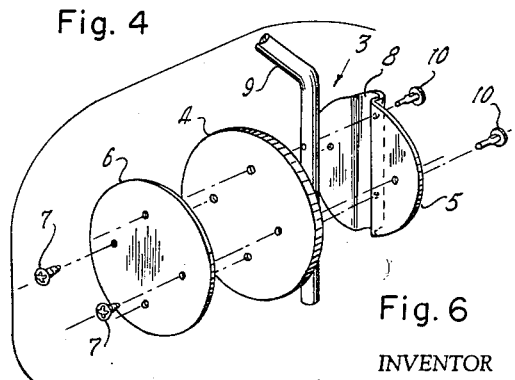
FIGURE 6 is an exploded perspective view, illustrating the several parts of the valve element and their respective positions.

Referring to the drawing, the numeral 1 designates a body comprising a length of light, thin walled pipe, preferably formed of aluminum, suitable for use in supplying water for irrigation purposes. The pipe 1 has a bead 2 on one of its ends. The numeral 3 designates generally a valve assembly embodying the invention. The valve assembly 3 preferably is disposed within the pipe 1 near one end thereof, whereby it is readily accessible, for convenience in installing the valve and thereafter repairing it. As shown, the valve assembly 3 is spaced inwardly from the bead 2.

The valve assembly 3 includes a valve disc 4, which is formed of resilient material, such as rubber or neoprene, and has a diameter slightly larger than the inside diameter of the pipe 1. A pair of backing plates 5 and 6, which are of smaller diameter than the valve disc 4 and advantageously may be formed of aluminum, for example, are secured to opposite sides of the valve disc 4, by means of a pair of diametrically opposed screws 7, whereby the valve disc 4 is reenforced while at the same time having a flexible peripheral edge portion extending radially outwardly beyond the backing plates 5 and 6 for sealing engagement with the inner wall of pipe 1. The valve disc 4 is adapted to be lubricated by water flowing through the pipe 1, whereby wear is minimized. The valve disc 4 may be conveniently replaced as necessary.

The backing plate 5 has a diametrical groove 8 therein, facing the valve disc 4, which advantageously may be formed by drawing. A rod 9, which is bent at an obtuse angle intermediate its ends, and advantageously may be formed of aluminum, serves as a combined valve stem and handle. The rod 9 is passed through openings therefor in opposite sides of the pipe 1, and one end thereof, which extends outwardly from the pipe 1, is inclined outwardly at an acute angle relative thereto whereby sufficient clearance is provided between said end of the rod 9 and the pipe 1 to permit the rod 9 to be readily grasped in the hand, and also afford ample leverage in turning the valve elements, as when sand has accumulated thereabout. The degree of bending of the rod 9 also avoids fatigue to the metal thereof, where it is inherently stronger, and less likely to break in use.

The rod 9 is secured in the groove 8, between the backing plate 5 and the adjacent side of the valve disc 4, by a pair of diametrically opposed fastening devices 10, as hereinafter described, which extend through the backing plate 5, the rod 9, and the backing plate 6, whereby the valve disc 4 and the backing plates 5 and 6 are rotatable axially with the rod 9, and form an integral unit.

The fastening devices 10 each consist of a pin having a head on one of its ends and having longitudinal grooves on opposite sides thereof adjacent the head. The fastening devices 10 are operable as wedges, as hereinafter described, whereby they are adapted to be applied to the work from one side thereof. The fastening devices 10 are spaced circumferentially relative to the screws 7, and have their grooved portions received in aligned openings therefor in the backing plate 5 and the rod 9. The heads of the screws 7 are positioned adjacent the opposite backing plate 6. The fatsening devices 10 have spurs extending outwardly from opposite sides of the grooves resulting from displacement of the material thereof adjacent the grooves, and the diameter thereof is such that they frictionally engage the openings therefor in the backing plate 5 and the rod 9. The fastening devices 10 have reduced end portions which are received in aligned openings therefor in the valve disc 4 and the backing plate 6, and these members lend rigidity to the stem 9 and to the valve assembly. The fastening devices 10, as well as the screws 7, are easily removable when it is necessary or desirable to repair or replace the valve assembly, or any part thereof.

It is not intended that the invention be necessarily limited to the specific structure herein described, and it is obvious that certain changes and modifications of the several parts and their arrangement may be resorted to by persons skilled in the art without departing from the spirit and intent of the invention or the scope of the appended claims.

What is claimed is:
1. The combination of a pipe having a smooth inner wall portion and a valve in the pipe comprising a valve disc formed of resilent material, a pair of backing plates, of smaller diameter than the valve disc, secured to opposite sides of the valve disc, whereby the valve disc is reinforced while at the same time having a flexible peripheral edge portion extending radially outwardly beyond the backing plates for sealing engagement with said inner wall portion of the pipe, one of the backing plates having a diametrical groove therein facing the valve disc, and a round rod of uniform diameter, bent at an obtuse angle intermediate its ends, operable as a combined valve stem and handle, having an end portion extending transversely through the pipe, the rod being secured in the groove, between said one of the backing plates and the adjacent side of the valve disc, whereby the valve disc and the backing plates are rotatable axially with the rod to regulate the degree of opening of the valve, the backing plates being secured to opposite sides of the valve disc by removable fastening devices extending through the valve disc and engageable with the backing plates, whereby the valve disc is secured between the backing plates, and the rod being secured in the groove, between said one of the backing plates and the adjacent side of the valve disc, by other removable fastening devices each consisting of a pin having a head thereon and having a first end portion adjacent the head frictionally engaging aligned openings therefor in said one of the backing plates and the rod, and having a reduced end portion opposite the head received in aligned openings therefor in the valve disc and the other of the backing plates, the rod being positioned on the downstream side of the valve disc, relative to the direction of flow through the valve, in the closed position thereof, whereby the flow of fluid around the rod, through the openings therefor in the pipe, is positively prevented.

2. The combination of a pipe having a smooth inner wall portion and a valve in the pipe comprising a valve disc formed of resilient material, a pair of backing plates, of smaller diameter than the valve disc, secured to opposite sides of the valve disc, whereby the valve disc is reinforced while at the same time having a flexible peripheral edge portion extending radially outwardly beyond the backing plates for sealing engagement with said inner wall portion of the pipe, one of the backing plates having a diametrical groove therein facing the valve disc, and a round rod of uniform diameter, bent angularly intermediate its ends, operable as a combined valve stem and handle, having an end portion extending transversely through the pipe, the rod being secured in the groove, between said one of the backing plates and the adjacent side of the valve disc, whereby the valve disc and the backing plates are rotatable axially with the rod to regulate the degree of opening of the valve, the backing plates being secured to opposite sides of the valve disc by removable fastening devices extending through the valve disc and engageable with the backing plates, whereby the valve disc is secured between the backing plates, and the rod being secured in the groove, between said one of the backing plates and the adjacent side of the valve disc, by other removable fastening devices, independently of the first mentioned fastening devices whereby the valve disc is secured between the backing plates.

References Cited in the file of this patent

UNITED STATES PATENTS

| | | |
|---|---|---|
| 1,978,145 | Rosenberg | Oct. 23, 1934 |
| 2,027,978 | Hoff | Jan. 14, 1936 |
| 2,054,064 | Anderson | Sept. 15, 1936 |
| 2,612,829 | Joyce | Oct. 7, 1952 |
| 2,695,625 | Ogle | Nov. 30, 1954 |
| 2,772,850 | Eaton | Dec. 4, 1956 |
| 2,816,729 | Jensen | Dec. 17, 1957 |